Patented Feb. 14, 1939

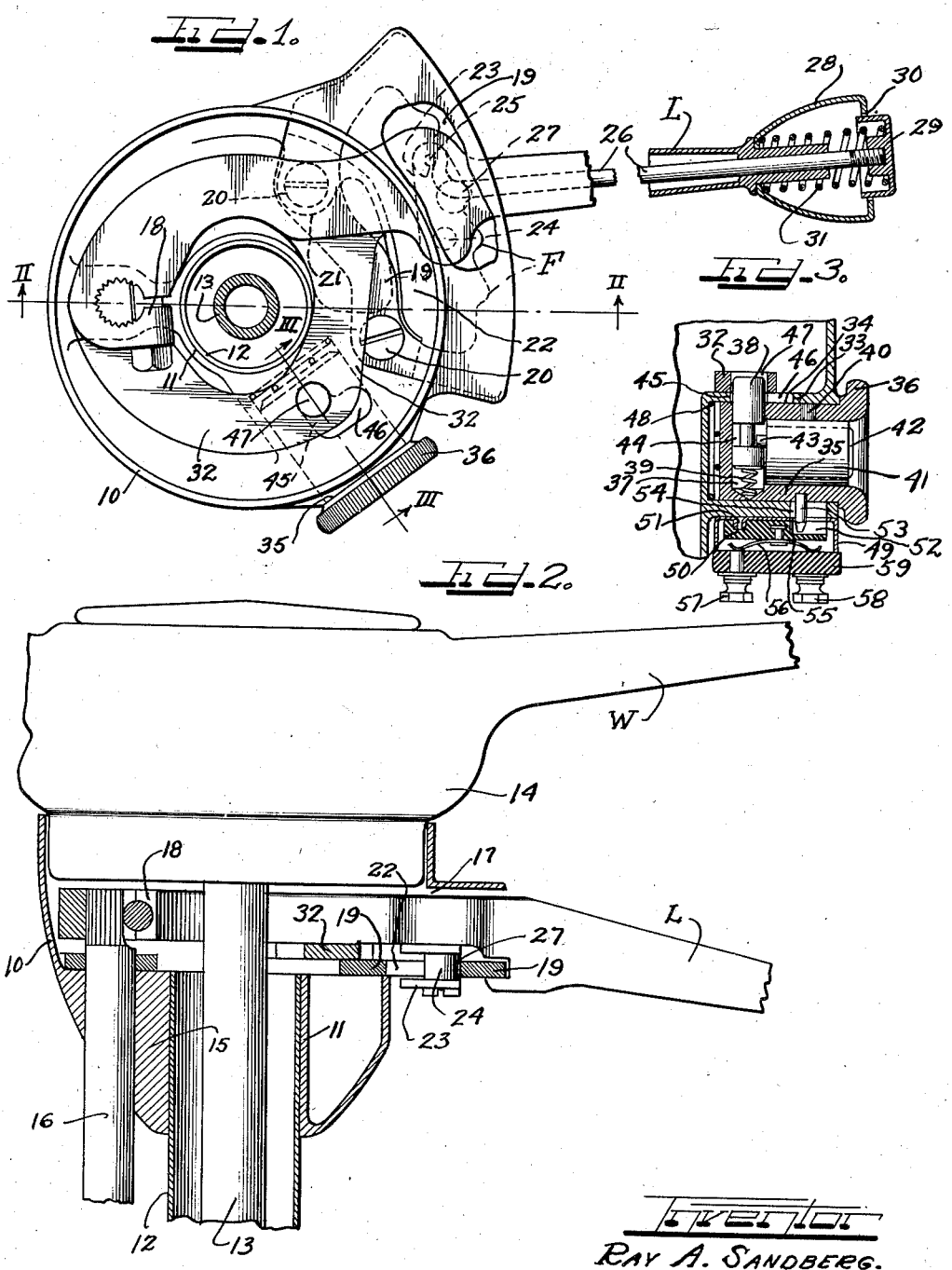

2,147,413

UNITED STATES PATENT OFFICE 2,147,413

AUTOMOBILE LOCKING STRUCTURE

Ray A. Sandberg, Waukegan, Ill., assignor, by mesne assignments, to Houdaille-Hershey Corporation, Detroit, Mich., a corporation of Michigan Application December 27, 1937, Serial No. 181,870

3 Claims. (Cl. 70—254)

This invention relates to an automobile locking structure and arrangement particularly applicable in installations where the transmission and setting controlling lever is located adjacent the steering wheel. In such installations a supporting structure or housing is usually secured to the upper end of the steering column below the steering wheel with a transmission selection shaft extending therefrom for connection with the selection and setting means of the transmission, this selection lever being secured to the shaft and extending laterally from the supporting housing for convenience in manipulation by the driver. Latching means is usually provided for latching the lever in its various positions of setting corresponding with the various transmission directions and speeds.

An important object of this invention is to provide a simple locking structure in association with the supporting housing structure for locking the lever and the shaft against any setting movement, such locking being preferably with the lever in set position corresponding with the neutral position of the transmission.

Another object is to utilize the same locking structure for locking other automobile controls, as for example the ignition circuit.

A further object is to associate the lock structure with the lever and shaft supporting housing structure so as to form a compact assembly, and with the housing structure and lock structure body forming part of a one-piece die casting.

The various features of the invention are incorporated in the structure shown on the drawing, in which drawing:

Figure 1 is a plan view of the selection lever and shaft supporting housing structure with the lock structure applied thereto;

Figure 2 is a section on the line II—II of Figure 1; and

Figure 3 is a section on the line III—III of Figure 1.

The housing structure 10 shown is of substantially cup shape and has a sleeve 11 extending upwardly therein to receive and be secured to the upper end of the steering column 12 through which extends the steering shaft 13 from the hub 14 of the steering wheel W. The housing 10 has a boss 15 for journalling the upper end of the selection controlling shaft 16 of the transmission which at its lower end is adapted for connection by linkage or levers with the selection and controlling mechanism associated with the transmission.

The lever L for rotating the shaft 16 extends into the housing 10 through a side opening 17 and its inner end has a clamp 18 securing it to the upper end of the shaft 16. Below the lever and extending outwardly through the side opening 17 is a quadrant plate 19 secured as by screws 20 to lugs 21 on the side wall of the housing 10. The plate is cut away to leave the clearance space 22 for a latch pawl structure 23 on the underside of the lever L. The latch pawl is pivoted at one end to the lever by a pin 24 and at its other end has a pin 25 receiving the inner end of the latch rod 26 which extends outwardly through the lever which is preferably hollow. Intermediate its end the pawl pivots a latch roller 27 adapted for latching cooperation with latching notches in the quadrant plate 19, the notch N corresponding with the neutral setting of the transmission, the notch R corresponding with the reverse setting, and the notches F corresponding with the forward speed settings of the transmission.

At its outer end, the rod 26 extends through the hollow knob 28 secured to the lever body and terminates in a button 29 operable in the opening 30 in the knob end, a spring 31 tending to resist inward shift of the button and to hold the button and the rod outwardly for yieldable latching engagement of the latching roller with the various latching notches. Upon the pushing of the button, the latch pawl will be swung to release the roller from the notch engaged thereby so that the lever may be readily swung for latched engagement with another notch. Upon release of the button, the lever will then be latched in such new setting position.

Describing now the locking structure, the lever has a locking extension or wing 32 within the housing at the right of the sleeve 11 and this wing may be continued around the sleeve to connect with the inner end of the lever below the clamp 18. Preferably the lever body is in the form of a die casting of which the wing is an integral part. Below this locking wing the outer wall of the housing 10 has the enlargement 33 which is bored to provide a radially extending cylindrical pocket 34 for receiving the cylindrical cup-shaped knob 35 terminating at its outer end in a knurled flange 36. In the bottom of the knob structure 35 is a cross-bore 37 for a locking bolt 38, a spring 39 tending to shift this bolt outwardly.

Secured to the knob structure in front of the cross-bore 37, as by a set screw 40, is the casing 41 of a cylinder lock, the key-operable cylinder 42 within the casing having an eccentric pin 43 extending from its inner end for engagement in the notch 44 in the lock bolt so that upon turning of the cylinder by the proper key, the lock bolt may be shifted inwardly against the resistance of the spring 39.

The outer end of the lock bolt 38 cooperates with an L-slot in the side wall of the enlargement 33 in which the knob structure is located, this slot having the leg 45 extending longitudinally relative to the knob structure 35, and the leg 46 extending circumferentially. The locking wing 32 on the lever L has the locking hole 47 for alignment with the inner end of the longitudinally extending leg 45 of the L-slot. The hole 47 is preferably so located that it will be in alignment with the L-slot when the lever L is in latching engagement with the notch corresponding with the neutral setting of the transmission. In the bottom of the pocket 34 is a spring 48 which tends to shift the knob structure 35 outwardly when the lock bolt is released from the housing 33. The drawing shows the lever L locked in its neutral setting position, the end of the bolt being in the hole 47 of the locking wing 32.

To unlock the lever, the lock cylinder 42 is turned by the key through 180 degrees to shift the locking bolt 38 inwardly to withdraw its end from the locking hole 47 but to retain the bolt end within the L-slot. As soon as the bolt is released from the locking hole 47, the spring will shift the knob structure 35 outwardly until the bolt end reaches the outer end of the longitudinally extending leg 45 of the L-slot, and the bolt end will be at the inner end of the circumferentially extending leg 46 of the L-slot, so that the knob structure 35 may now be rotated.

This rotary movement of the knob structure 35 is utilized for operating an electrical switch, such as the switch for controlling the ignition. The switch shown comprises a housing or box 49 secured against the underside of the enlargement 33 in which the knob structure 35 is operable. A switch block 50 is pivoted at one end on a pivot projection 51 at the bottom of the switch box, the block at its outer end having a slot 52 into which extends the actuating pin 53 secured to the knob structure 35, the knob structure having the clearance space 54 and the bottom of the switch box having the clearance space 55 for the pin.

The switch blade 56 on the switch block is cooperable with circuit terminals 57 and 58 on the cover 59 for the switch box, the terminal 57 being in axial alignment with the switch block pivot pin 51 and the inner end of the switch blade and this terminal is usually connected with a source of current, as for example an automobile battery. The other terminal 58 may be connected with the ignition circuit and is normally to one side of the outer end of the switch blade so as to keep the circuit open. When the lever L is unlocked and the knob structure 35 has been shifted outwardly by the spring 48 with the end of the lock bolt 38 in alignment with the circumferentially extending leg 46 of the L-slot, turning of the knob structure in clockwise direction will cause the pin 53 to swing the switch block 50 for engagement of the outer end of such switch blade with the terminal 58 for closure of the ignition circuit. When the switch operating knob structure 35 is in switch opening position, the knob structure cannot be shifted inwardly for locking of the lever element, but the knob structure must first be rotated in counter-clockwise direction to reopen the switch and to bring the end of the lock bolt into alignment with the longitudinally extending leg 45 of the L-slot. The lock cylinder is then turned by the key to release the lock bolt for outward shift by the spring 39 and the knob structure 35 is pushed in and if the lever L is in its neutral setting position, the bolt will be projected into the locking hole 47 of the locking wing 32 to lock the lever. If the lever is not in neutral setting position, the lock bolt will abut against the underside of the wing 32 ready to be projected into the locking hole 47 when the lever is moved to its neutral setting position.

With the locking arrangement shown, the switch is locked against operation while the lever L is locked and the switch cannot be operated until the lever is unlocked and the switch operating knob structure 35 released and shifted out to operating position. Neither can the lever be relocked until the switch has been reopened. The locking structure and the lever supporting housing structure form a compact assembly with the supporting body for the locking part preferably being part of the integral die-casting which forms the housing 10 for the lever structure.

I have shown a practical and efficient embodiment of the various features of the invention, but I do not desire to be limited to the exact construction, arrangement and operation shown and described, as many modifications may be made which will still come within the scope of the invention.

I claim as follows:

1. A locking mechanism for the purpose described comprising a housing for receiving a control member to be locked, said housing having a bore, a knob structure shiftable axially and being rotatable in said bore, a locking bolt at the inner end of said knob structure shiftable to locking or unlocking position, an L-shaped slot in the housing wall around said bore into which said bolt projects, said bolt when in the inner end of said L-slot being shiftable through said slot for interlocking engagement with said control member to lock said member, and said bolt, when in the inner end of said L-slot, preventing rotation of said knob structure but permitting outward shift of the knob structure when the bolt is withdrawn from interlocking engagement with said control member, said bolt when in the outer end of said L-slot permitting rotation of said knob structure, an electrical switch operable by the rotational movement of said knob structure, and key operable means in said knob structure for controlling the shifting of said locking bolt to locking or unlocking position.

2. Lock structure of the class described comprising a housing for receiving a control member provided with a locking opening, said housing having a bore, a knob structure rotatable and axially shiftable in said bore, a lock bolt transversely shiftable in said knob structure to locking or unlocking position and when shifted to locking position being adapted for engagement in the control member locking opening for locking said member, a key operable lock cylinder for controlling the shifting of said bolt, the housing wall around said bore having an L-shaped slot into which said bolt extends and through the inner end of which it may be projected for interlocking engagement with the control member, spring means for shifting said knob structure outwardly when said bolt is withdrawn from said control member and for positioning said bolt in the outer end of said slot, said bolt when in the outer end of said slot permitting rotation of said knob structure, and an electrical switch operable by the rotational movement of said knob structure.

3. A lock structure of the class described comprising a housing for receiving a control member provided with a lock bolt receiving opening, said housing having a bore, a knob structure axially shiftable and rotatable in said bore, a lock bolt in said knob structure, a lock cylinder in said knob structure key operable to control the shift of said lock bolt to locking or unlocking position, said housing wall around said bore having a slot comprising a longitudinally inwardly extending part and an outer circumferentially extending part, spring means normally shifting said knob structure to its outer position with said lock bolt projecting into the outer part of said slot in which position said knob structure may be rotated, a switch controlled by the rotation of said knob structure, said lock bolt upon inward shift of said knob structure being outwardly shiftable through the longitudinally extending part of said slot for engagement in said control member opening for locking said member and for locking said knob structure against outward shift by said spring means.

RAY A. SANDBERG.